United States Patent [19]
Chance

[11] Patent Number: 4,810,944
[45] Date of Patent: Mar. 7, 1989

[54] INTERIOR PROTECTION SYSTEM

[76] Inventor: Jeff Chance, P.O. Box 1540, Laporte, Ind. 46350

[21] Appl. No.: 170,369

[22] Filed: Mar. 18, 1988

Related U.S. Application Data

[62] Division of Ser. No. 924,793, Oct. 30, 1986.

[51] Int. Cl.$^4$ .............................................. H01H 29/00
[52] U.S. Cl. .................................... 318/483; 200/61.05
[58] Field of Search .................... 318/483, DIG. 2; 15/250 C, 250.12, 250.13; 200/61.04, 61.05

[56] References Cited

U.S. PATENT DOCUMENTS

| | | | |
|---|---|---|---|
| 2,617,972 | 11/1952 | Nutter | 318/483 |
| 2,640,958 | 6/1953 | Davis | 318/470 |
| 2,731,588 | 1/1956 | McLeod | 318/483 |
| 2,753,508 | 7/1956 | Inman | 318/483 |
| 2,754,460 | 7/1956 | Goldman | 318/102 |
| 2,802,694 | 8/1957 | Murray | 296/117 |
| 2,823,346 | 2/1958 | Weber | 318/483 |
| 2,843,690 | 7/1958 | Miller | 200/61.43 |
| 2,994,525 | 8/1961 | Onksen et al. | 49/21 |
| 3,307,095 | 2/1967 | Redmond | 318/483 |
| 3,386,022 | 5/1968 | Redmond | 318/483 |
| 3,465,476 | 9/1969 | Rayner et al. | 49/28 |
| 3,555,289 | 1/1971 | Sobkow | 318/483 |
| 3,727,348 | 4/1973 | Steinmann et al. | 49/28 |
| 3,793,772 | 2/1974 | Kouth | 49/28 |
| 3,830,018 | 8/1974 | Arai et al. | 49/28 |
| 4,051,336 | 9/1977 | Miller | 200/61.43 |
| 4,115,952 | 9/1978 | French | 49/26 |
| 4,317,073 | 2/1982 | Blaszkowski | 318/483 |
| 4,351,016 | 9/1982 | Felbinger | 361/181 |
| 4,369,344 | 1/1983 | Diamond | 200/61.43 |
| 4,450,390 | 5/1984 | Andrei-Alexandru et al. | 318/286 |
| 4,458,445 | 7/1984 | Sauer et al. | 49/26 |
| 4,527,106 | 7/1985 | Fischer | 318/483 |

FOREIGN PATENT DOCUMENTS

| | | | |
|---|---|---|---|
| 2057062 | 11/1970 | Fed. Rep. of Germany | 318/483 |
| 2013428 | 8/1979 | United Kingdom | 318/265 |

Primary Examiner—Bentsu Ro
Attorney, Agent, or Firm—Cook, Wetzel & Egan, Ltd.

[57] ABSTRACT

There is provided a moisture-responsive system for protecting the interior of an enclosure such as a motor vehicle which includes an opening; a closure for the opening; a moisture sensor for providing a moisture signal in response to sensing of moisture in excess of a predetermined threshold; a circuit coupled to the closure and the moisture sensor for providing a signal to actuate the closure in response to receipt of a moisture signal and for sensing obstructions of the closure and temporarily terminating the actuation of the closure in response thereto.

There is also provided an improved moisture sensor comprising conductive plates separated by and supported on an insulating layer with a raised bulbous portion which extends above the plates to predetermine the amount of moisture necessary to electronically bridge the gap between the conductive plates and therefore the level at which the sensor commences to sense moisture.

4 Claims, 4 Drawing Sheets

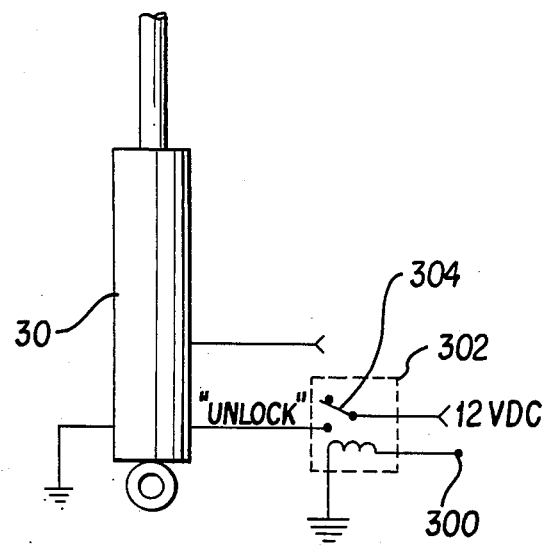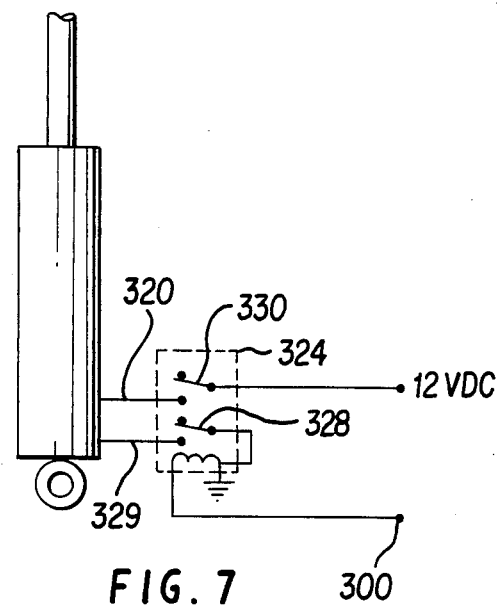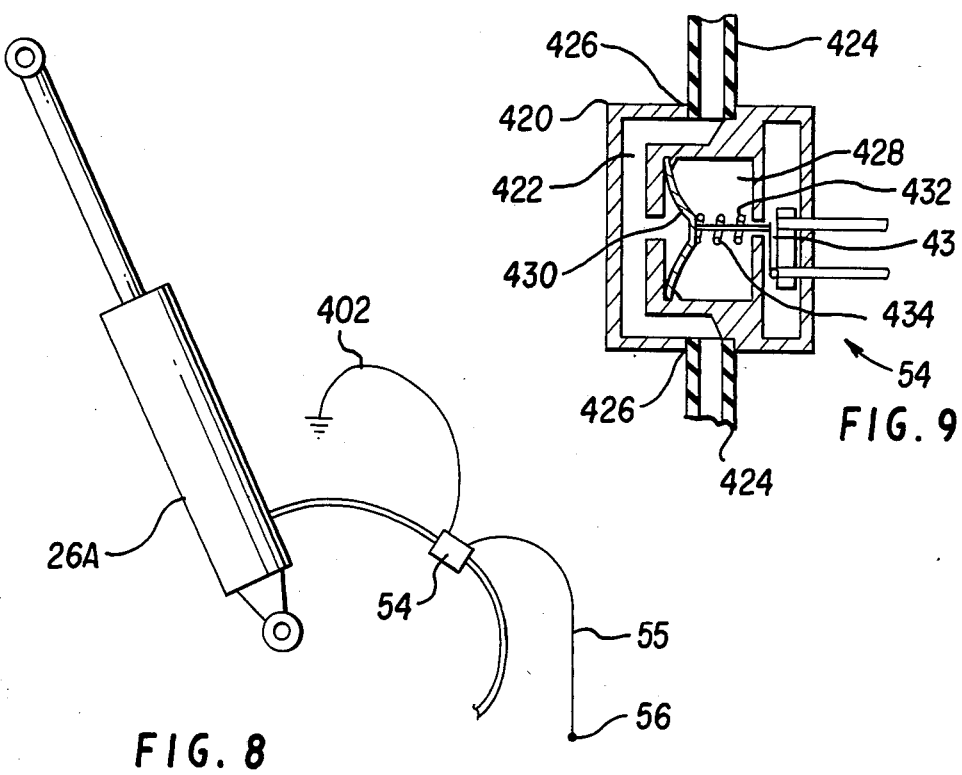

4,810,944

INTERIOR PROTECTION SYSTEM

This is a division of application Ser. No. 924,793, filed Oct. 30, 1986, still pending.

TECHNICAL FIELD

The present invention pertains generally to automatic moisture-responsive systems for closing external openings of motor vehicles, such as windows, sun roofs, or convertible tops, and in particular to a system which provides repeated closure attempts to overcome blockage by a temporary obstruction and avoids an attempt to close those external openings which are already closed.

BACKGROUND OF THE INVENTION

Moisture-responsive systems which protect the interior of a motor vehicle from water damage by closing all open external openings, such as windows, sun roofs, convertible tops, etc., in response to the detection of rain are known. Such systems generally include a moisture-sensitive probe arranged to detect moisture outside of the vehicle and which produces a signal responsive to detecting an excessive moisture condition. The signal produced by the probe is impressed upon a switch which activates a circuit for producing signals which are received by motorized mechanisms for closing window structures and the like.

One such system typical of the prior art is disclosed in U.S. Pat. No. 2,994,525. In that system, a signal from a moisture sensor actuates a series of relays which cause a motor to rotate a drive shaft which carries a plurality of cams. The cams of the rotating shaft sequentially actuate individual window motors. The motors have limited torque output and as a result, a motor will stall when an obstruction in its corresponding window is encountered.

Another such system is disclosed in U.S. Pat. No. 2,823,346. That system closes all openings in response to the detection of rain, but reopens such openings when rain is no longer detected unless the doors of the motor vehicle have been previously locked. The reopening of the windows avoids the build up of heat within the closed vehicle while the detection of locked doors ensures security by maintaining the windows in a closed position.

None of the systems of the prior art accommodates the possibility that an obstruction which prevents the closure of an opening may only be temporary. For example, the obstruction may simply be a person's arm resting on top of a window preventing the window from rising to its closed position. When an obstruction is encountered by the systems of the prior art, such systems simply leave the window, sunroof, etc., in the stalled position. Thus, if the obstruction is only temporary, the opening would still be left open permitting rain water to enter the interior of the vehicle and possibly cause water damage.

SUMMARY OF THE INVENTION

The system of the present invention senses moisture and commands the closure of external openings. However, the instant system only activates closure motors associated with those operations which are open. This provides a system having increased efficiency because time and battery power are not wasted while attempting to close openings which are already closed. Additionally, if an obstruction is encountered, the system of the present invention will repeat a limited number of attempts to close the opening having the obstruction. Thus, if an obstruction is only temporary, the opening will eventually be closed, preventing possible water damage to the interior of the motor vehicle.

Therefore, an aspect of the present invention is to provide a moisture-responsive system for closing motor vehicle openings which provides repeated attempts to close an opening when an obstruction is encountered.

Another aspect of the present invention is to provide such a system which insures that no more than two openings are activated at any given time so as to avoid overloading the power system of the vehicle and the control wiring of the system.

Yet another aspect of the present invention is to provide an automatic moisture-responsive system which will not accidentally close an opening which is obstructed by, e.g., the limbs of the occupants of the vehicle.

A further aspect of the present invention is to provide a moisture-responsive system for a motor vehicle which insures that the vehicle is unlocked after all openings have been automatically closed in response to sensed moisture so that the operator of the vehicle will not be inadvertently locked out of the vehicle.

Yet a further aspect of the present invention is to provide a system which only actuates those closures which are, in fact, open so as to prevent unnecessary repeated actuation of the electric motors associated with those openings which are closed.

Another aspect of the invention is to provide an improved moisture sensor for detecting moisture in excess of a predetermined threshold.

BRIEF DESCRIPTION OF THE DRAWINGS

These and other aspects of the invention will become more apparent to those skilled in the art from the following disclosure and accompanying figures wherein:

FIG. 6 is a schematic diagram of an actuation circuit for an electronic lock with straight polarity activation;

FIG. 7 is a schematic diagram of an actuation circuit for an electronic lock with reverse polarity activation;

FIG. 8 is a wiring diagram for a hydraulically actuated limit switch located on a hydraulic actuator for a closure;

FIG. 9 is a sectional view of a hydraulically actuated limit switch; and

DETAILED DESCRIPTION OF THE PREFERRED EMBODIMENT

The instant invention encompasses an interior protection system wherein a circuit controls the actuation of motor vehicle closures such as windows, sunroofs or the like coupled thereto in response to the receipt of signals from sensors or switches also coupled to the circuit. More particularly, the circuit causes the closing of a number of closures in response to the detection moisture resulting from, for example, rain.

The circuit is responsive to sensed obstructions which prevent the closing of a closure. The circuit reacts to obstructions by attempting a limited number of closings with the aim of allowing temporary obstructions to be freed which in turn allows the closures to close.

Additionally, the circuit unlocks the electronic locks of a motor vehicle to prevent the operator of the vehicle from being inadvertently locked out of the vehicle once the closures have been closed.

Figure 1:
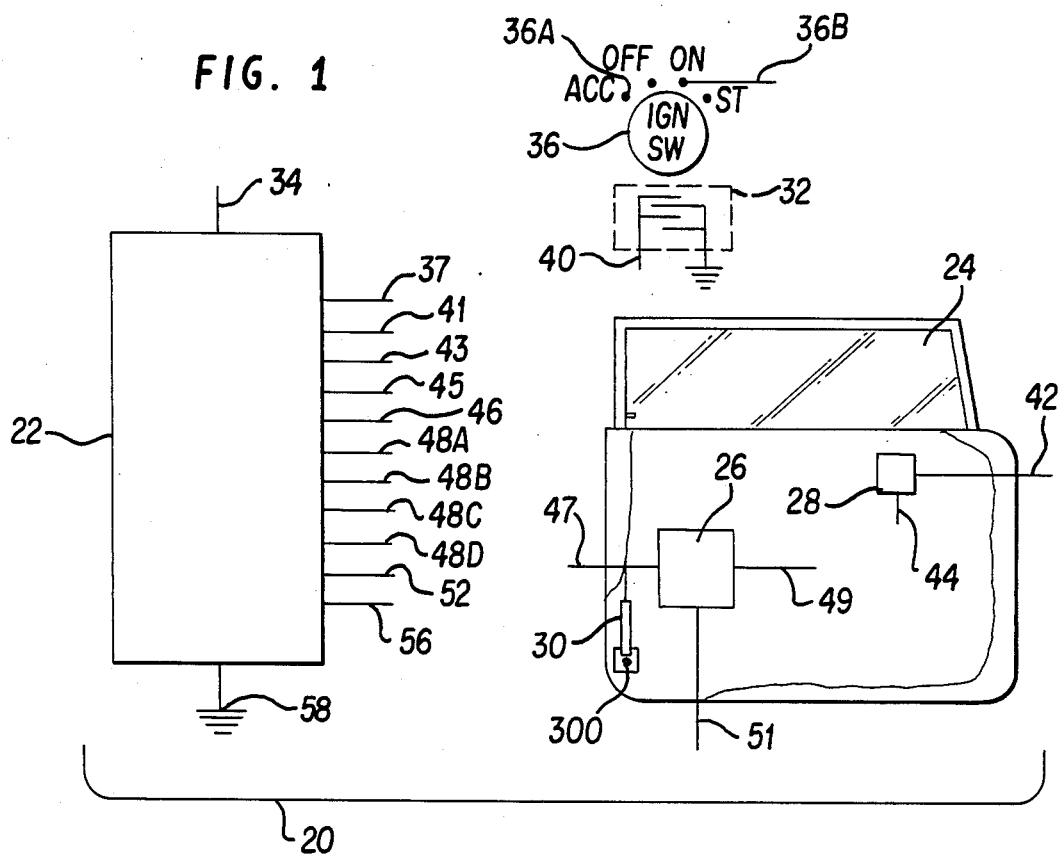
FIG. 1 is a system wiring diagram showing the major components of the system and their input and output contacts.

In FIG. 1, a system 20 embodying the present invention is illustrated in general wiring form. It shows the interaction of the circuit, generally designated at 22, and the closures, sensors and limit switches coupled thereto.

The closures actuated by the circuit 22 are shown representatively by the door window 24. Although the system may accommodate any number of closures, for the purposes of simplicity and ease of understanding, only the actuation of one such window 24 will be discussed. References to the closures will be made in the singular except as otherwise may become necessary to explain where and how multiple closures are accommodated by the system.

Figure 4:
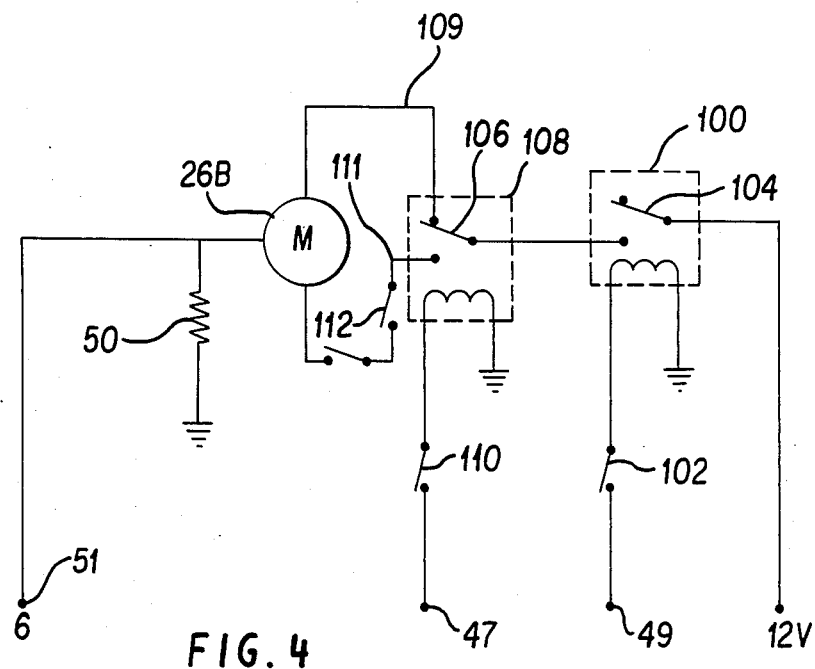
FIG. 4 is a schematic diagram of a circuit which can be utilized in practicing the present invention for activating and controlling the operation of a reversible closure motor with straight polarity activation.
Figure 5:
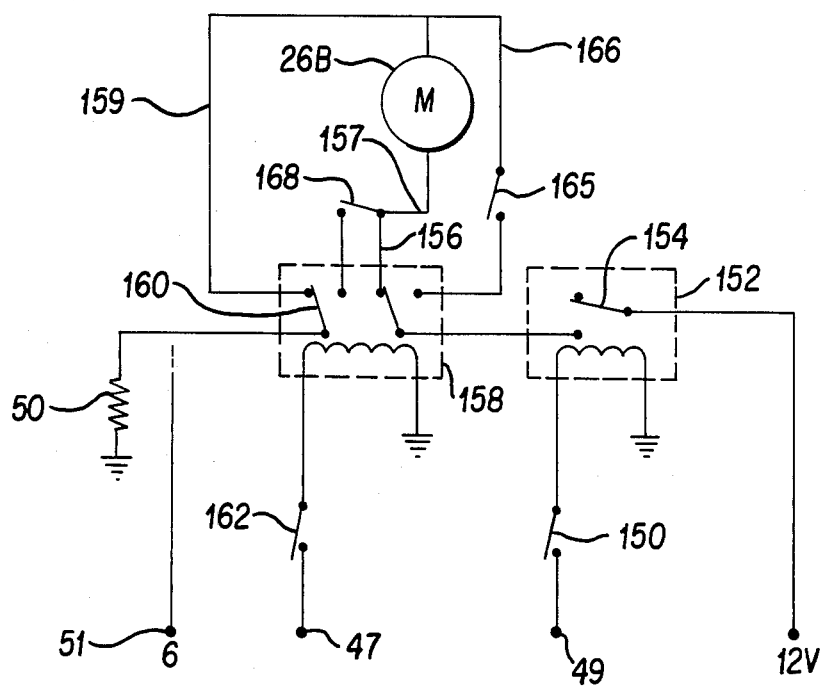
FIG. 5 is a schematic diagram of a circuit which can be utilized in practicing the present invention for activating and controlling the operation of a reversible closure motor with reverse polarity activation.

As is shown in FIG. 1, the window 24 is moved between closed and open positions by an actuator 26. Such actuator 26 may be either a hydraulic actuator 26A as is shown in FIG. 8 or an electric motor 26B as is shown in FIGS. 4 and 5. The particularities of the activation and control of these actuators are discussed further below.

To determine whether a window or closure 24 is open, the system includes a closure position limit switch 28, the contacts of which are open when the window 24 is in its closed position. Preferrably one such limit switch 28 is provided for each closure 24.

The motor vehicle may also include an electronic lock 30 which is actuatable by the circuit 22. When such lock 30 is present, the system will simultaneously actuate such a lock with its associated closure whenever the closure 24 associated therewith is commanded to close. For example, whenever the window 24 of the driver's door of a vehicle is actuated to its closed position, the lock in the door will be actuated to its unlocked position.

The system 20 further includes a moisture sensor 32. When the sensor senses moisture in excess of a predetermined threshold, it produces a signal which is received by the circuit 22.

With continuing reference to FIG. 1, a twelve volt DC power supply (not shown) is coupled to the circuit 22 at power input 34. Twelve volts DC can also be coupled to the circuit at 37 through the vehicle ignition switch 36 to disable the circuit as will become apparent when the circuit is described in greater detail. To that end, twelve volts DC are coupled to the "ACC" contact 36A at the ignition switch. As will become clear below, whenever the ignition switch 36 is turned to its "on" position, the twelve volts at contact 36A will be coupled to the circuit 22 through "on" contact 36B to serve to disable the circuit. This is provided because if the ignition is on, the motor vehicle is likely to be occupied and, as a result, the system need not be operative because the vehicle occupant or occupants will be available to control the condition of the windows and other closures.

Other switches can be used in place of the ignition switch without departing from the spirit of the invention. The ignition switch 36 is merely exemplary of one way in which the present invention can be practiced.

The moisture sensor 32 has an output at contact 40 which is coupled to the circuit 22 at moisture sensor input 41 which signals the pressure of moisture in excess of a predetermined level. All closure position switches 28 have a pair of contacts 42 and 44 coupled to the circuit at position switch input 43 and position switch output 45 respectively. A switch 28 opens whenever the closure associated therewith is closed and such opening of a switch 28 is used by the circuit 22 to disable itself as will become clear in the detailed description of the circuit. The closure position switches are all wired in parallel such that one contact 42 from each position switch 28 is coupled to position switch input 43 and the remaining contacts 44 from each position switch 28 are coupled to position switch output 45. The terms "position switch input" and "position switch output" refer to the circuit 22 and are an input and an output respectively of the circuit. The distinction is made for clarity in the detailed description of the circuit below.

The circuit generates two types of outputs for the closure actuators, namely, a common open command and individualized close commands at circuit outputs 46 and 48A through 48D respectively. The open command is coupled to each lead 47 of the various actuators 26. The close commands are coupled individually to their respective actuators at the actuator leads 49. Individual close commands are provided for each closure in the system so that overloading of the control and power wiring is minimized by individual actuation. Only one open command is provided for all closures because should the command ever be generated in response to sensing of an obstruction, only one closure can be affected at any given time. The system may include any number of close commands to accommodate any number of closures 24.

To detect the presence of an obstruction, the system senses the overloading of an actuator 26 as it struggles to close a closure 24 against the obstruction. If the closure actuator 26 is an electric motor 26B, a shunt 50 similar to that shown in FIGS. 4 and 5 is provided to allow for sensing of current overload. The shunt produces an output at 51 and is coupled to the circuit 22 at overload sensor input 52. However, if the actuator 26 is a hydraulic cylinder 26A such as that shown in FIG. 8 with a limit switch 54 similar to that in FIGS. 8 and 9, then the switch 54 output at 55 is coupled to the circuit 22 at overload switch input 56. The outputs at 51 of all overload sensors are coupled to the single overload sensor input 52. The outputs at 55 of all overload switches 54 are coupled to the single overload switch inputs 56.

Grounding of the circuit 22 is effected through ground contact 58.

Having thus described the system 20 and its component parts in general terms, the devices coupled to the circuit 22 will be described in greater detail.

Figure 2:
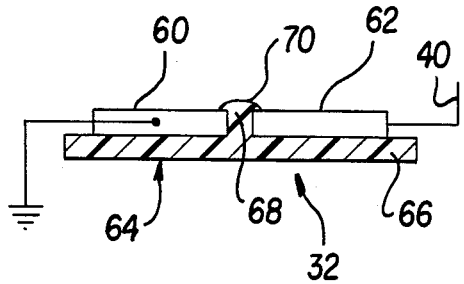
FIG. 2 is a sectional view of a moisture sensor which can be utilized in practicing the present invention.
Figure 3:
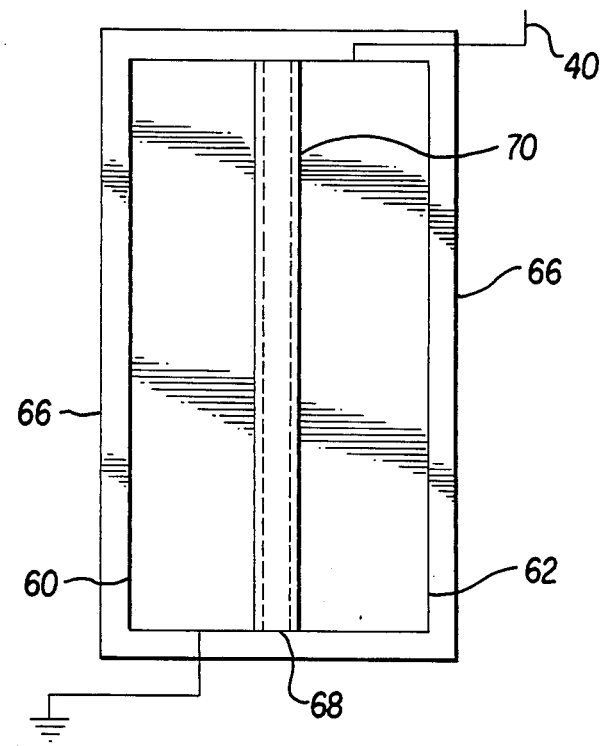
FIG. 3 is a top view of the moisture sensor of FIG. 2.

A moisture sensor 32 which can be used in practicing the invention is shown in detail in FIGS. 2 and 3. The sensor comprises two conductive plates 60 and 62 separated by and laying on top of insulation 64. Plate 60 is grounded while lead 40 connected to plate 62 is coupled to the circuit 22 at moisture sensor input 41. Whenever sufficient moisture builds up on the sensor to electrically bridge the plates 60 and 62, electrical connection is effectively made between the plates which is detected by the circuit.

The insulation 64 comprises an insulating plate 66 and plate separating wall 68. The thickness of the wall 68 determines, in part, the distance between the plates and thus the threshold of moisture needed to bridge the gap between the plates. At the top of the wall 68 is a raised bulbous portion 70 which runs the entire major dimension of the plates. The raised bulbous portion 70 extends slightly over the plates to provide a groove to hold them in place on the insulating form 64 and to provide a low profile surface which also predetermines the moisture build up necessary to make an electrical connection between the two conductive plates.

FIGS. 4 and 5 illustrate the control wiring for an electric motor actuator 26B. The wiring in FIG. 4 is used for a reversible motor with straight polarity activation while the wiring in FIG. 5 is used for reversible motors with reverse polarity activation.

Referring particularly to FIG. 4, whenever a close command is issued at 49, relay 100 is energized unless the closure associated with the motor is already closed in which case the limit switch 102 will be open preventing energization of the relay. An energized relay 100 pulls in switch 104 to couple twelve volts then becomes available to the motor 26B through wire 109 causing current to flow through the motor to shunt 50 and then to ground. The closure 24 (as shown in FIG. 1) will then travel to its closed position until limit switch 102 opens.

When an obstruction is encountered by the closure associated with the motor 26B, the motor will struggle to overcome the obstruction and will draw increasing amounts of current as is known in the art. The shunt 50 provides a means for measuring the current draw of the motor as is also well known in the art. As the current draw increases, the voltage across the shunt 50 will also increase and this can be compared to a known voltage by a comparator. Thus it is possible to infer the presence of an obstruction by current draw in excess of a threshold.

When an obstruction is encountered, the circuit 22 will issue an open command at 47. The close command is maintained to couple the twelve volts to the motor. An open command at 47 energizes relay 108 unless the closure is in the closed position in which case the limit switch 110 will be open preventing energization of the relay. Limit switch 110 prevents reopening of those windows which are already closed. An energized relay 108 switches switch 106 to wire 111 so that the motor is caused to reverse itself as is known in the art. The closure will then open until limit switch 112 opens to prevent further opening of the closure.

In FIG. 5, the wiring for a motor actuator 26B with reverse polarity activation is shown. The activation of the motor is similar to that described in connection with FIG. 4 with the difference being how current is directed through the motor.

When the close command is sent to the motor 26B at lead 49, relay 152 is energized pulling in switch 154 to couple twelve volts DC to switch 156 of relay 158 unless the closure is closed in which case switch 150 is open preventing further closing of the closure. Current flows through switch 156 along wire 157 to the motor 26B. From the motor the current flows along wire 159 through switch 160 to shunt 50 and then to ground. Again the shunt is tapped to provide the overload sensor input at 51 as is well known in the art.

Should an obstruction be encountered, the open command at lead 47 energizes relay 158 unless the closure is in its closed position in which case switch 162 is open preventing the open command from reaching the relay to prevent closed closures from reopening. An energized relay 158 pulls its switches 156 and 160 such that the current flow through the motor 26B is reversed.

Because the close command is still issued, the twelve volts is still directed to switch 156. However, in the switched position, current now flows through switch 165 and along wire 166 to the motor, then from the motor along wire 157 to switches 168 and 160 and then to ground. The closure will open until switch 165 opens to prevent further opening of the closure.

In FIG. 6, the wiring for activating an electric lock actuator 30 with straight polarity is shown. The close signal at 48 is coupled to the electronic lock at 300. The close signal at 300 energizes relay 302 to pull switch 304 to couple twelve volts DC to the "unlock" contact of the lock actuator. Thus, whenever the close signal is generated at 48 in response to the detection of moisture, the lock associated with the closure receiving the signal will be unlocked.

It is possible and so contemplated by the invention that only one closure 24 will have its associated lock actuator coupled to its close output signal. For example, only the driver's side of the motor vehicle need have its lock hooked-up for automatic actuation.

Illustrated in FIG. 7 is the corresponding wiring for a lock actuator with reverse polarity activation. The close signal at 48 energizes a relay 324. An energized relay 324 pulls switches 330 and 328 such that the wiring 329 is connected to ground and the "unlock" lead 320 is coupled to twelve volts DC as is well known in the art.

A hydraulic overload detection switch 54 is shown in more detail in FIGS. 8 and 9. In FIG. 8 the hook-up wiring is illustrated as is the switch's placement in a hydraulic line.

The switch 54 is placed in between a hydraulic actuator 26A and its hydraulic source. One contact of the switch 54 is grounded through lead 402 while the other lead 55 is connected to overload switch input 56. The switch 54 is normally open and whenever the hydraulic pressure exceeds a predetermined threshold, the switch will close grounding overload switch input 56. Thus a negative polarity signal at input 56 signals the overloading of a hydraulic actuator.

In FIG. 9, the hydraulic overload detection switch 54 is shown in sectional form. It can be seen that the switch 54 comprises a case 420 with passage 422 for the hydraulic fluid. A hydraulic line 424 is connected to both openings 426 of the passage. The passage 422 opens into a chamber 428 containing a diaphragm 430 with spring 432 and plunger 434 connected thereto. Hydraulic forces push the diaphragm against the spring as the pressure of the fluid rises. At the same time, diaphragm 430 pushes plunger 434 toward hinged leaf 436 of the switch.

When the pressure of the fluid becomes great enough, the fluid forces against the diaphragm overcome the opposing spring forces and the plunger strikes the leaf closing the contacts of the switch 54 as is well known in the art.

Having described the actuation of the various devices of the system 20 and of the interfacing between the various devices, sensors and switches with the circuit 22, the circuit 22 will now be described in detail with reference to FIG. 10 wherein the circuit is shown in schematic form.

The twelve volt power supply coupled to power input 34 is used by voltage regulating chip 502 to generate five volts DC at 503 which are used by the various amplifiers and TTL timing and counting circuits discussed below. The chip 502 is known in the art as a 7805 voltage regulator.

The five volts are provided to the circuit of the system through both the closure position switch 28 and relay switch 504. The five volts is output from the circuit 22 at position switch output 45 and then returned to the circuit at position switch input 43. Recalling that all of the position switches 28 are hooked-up in parallel, when all of the closures 24 of the system are closed, all switches 28 are opened and the five volts are unavailable to the circuit rendering the circuit inoperational. However, should at least one closure 24 be open, then input 43 will be coupled to output 45 and the five volts become available to the circuit.

The relay 504 can also cut-off the five volt power supply from the circuit. This relay is activated whenever the ignition switch 36 is turned to the "on" position to decouple the five volt power source from the circuit. Turning the ignition switch to the "on" position energizes the coils of relay 504 causing switch 505 to open. Therefore, if the motor vehicle is running, the system is inoperational and the occupants must close all windows themselves.

The moisture sensor 32 is coupled at input 41 to operational amplifier 506 which operates off of the five volt power provided to the circuit after the relay switch 505 closes.

The output 510 of operational amplifier 506 is held in a negative polarity state by resistor 508 as is well known in the art. When sufficient moisture builds up on the sensor 32 to cause contact 41 to become grounded, a negative charge is sent through the moisture to input 41 and the operational amplifier output at 510 changes from negative to positive. This output at 510 is inverted by inverter 512 to provide proper polarity to actuate timer 514A. Operational amplifier 506 is known in the art as a 272 operational amplifier. Inverter 512 and all of the other inverters in the circuit are known as 7404 inverters.

Timers 514A through 514D are four one-shot TTL 558 timers, each associated with its own closure 24, which generate a signal at 515 whenever each times out. Each timer times for an adequate period so that the closure associated with the preceding timer 514 has enough time to travel from complete open to complete closed. The timers are actuated in sequence from 514A to 514D so that overloading of the power wiring is prevented. Each timer is activated by the timing out of the preceding timer in the sequence. When timer 514D finishes timing out, outputs 515A through 515D are generated at 515A through 515D concurrently.

The output 515 of each timer 514 is directed to a corresponding amplification circuit 516. For example, the output of timer 514A is coupled to amplification circuit 516A. The timer 514 outputs turn on amplification circuits 516 in sequence to produce close command outputs at 48A through 48D, respectively.

Figure 10:
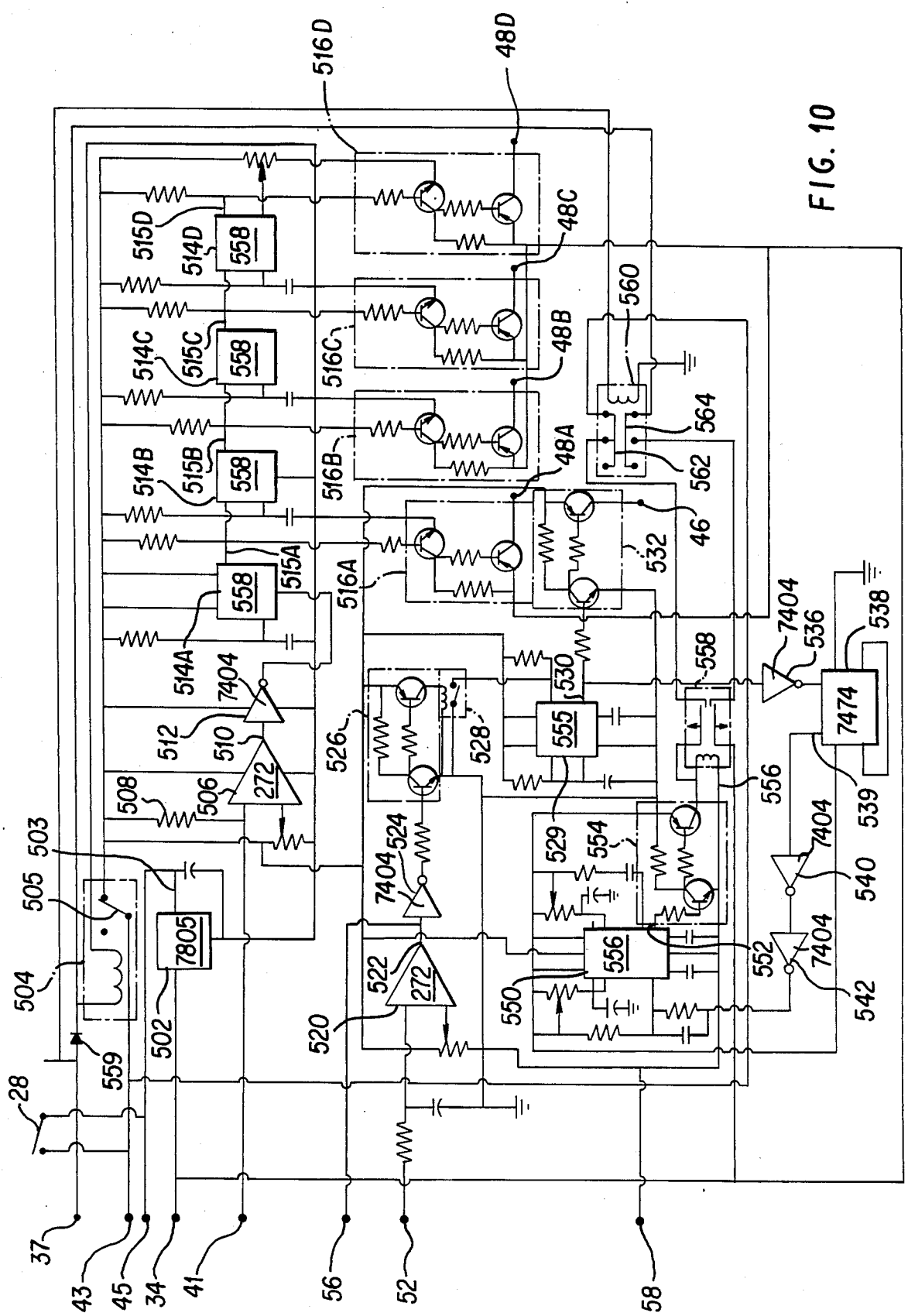
FIG. 10 is a schematic diagram of a circuit embodying the present invention.

It should be remembered that although only timers 514 and outputs at 48 for four closures are shown in the FIG. 10, any number of outputs and closures can be accomodated by the system by simply adding more timers 514 and amplification circuits 516 as is well known in the art.

Once a closure motor 26B has been commanded to close a window, the amperage of the motor is monitored. A shunt 50 provides a tap from which to monitor the current flow as discussed previously. The outputs of all shunts 50 are connected in parallel and coupled to the overload input 52 of differential amplifier or comparator 520. Differential amplifier 520 is also a 272 operational amplifier.

When the current level demands of a motor becomes high enough, the comparator 520 generates an output at 522 as is well known in the art. It is presumed that the high current demand is the result of an obstruction which inhibits the closing of a window 24.

The signal at 522 is first inverted by inverter 524 and then coupled to an amplifier circuit 526 which drives a relay 528. An energized relay 528 switches on a timing circuit 529 known well in the art as a TTL 555 timer. Timing circuit 529 times only for a limited predetermined interval as is well known in the art before it turns itself off. The interval is sufficiently long enough so that the closing process of all other closures can be completed before a second attempt is made on the obstructed closure.

When the timing circuit times out, it generates a signal at 530 which is coupled to an amplification circuit 532 which in turn generates the open command at 46.

The generation of the open command reverses any stalled motor 26B permitting whatever obstruction is barring the closing of the window 24 to be removed. This is also a safety feature should the obstruction be a limb of a person. Reopening the widow allows a person to e.g., remove the obstruction before a second attempt is made by the system to close the window.

The output at 530 of the timing circuit is also inverted by inverter 536 and then coupled to a flip-flop 538 which acts as a divide-by-two counter. The flip-flop changes its logical output state at 539 every other time the timer is triggered to time out and open the window. The output at 530 is inverted by inverter 536 before entering flip flop 538 for polarity purposes as is known in the art.

It should be clear to those skilled in the art that a divide-by-two counter such as flip-flops 538 only permits the system one subsequent attempt to close an obstructed closure. Other counters can easily be substituted for the flip-flop 538 which permits a greater number of repeated closing attempts.

The flip flop output at 538 is double inverted for buffering purposes before it is sent to two-stage timer circuit 550 by inverters 540 and 542. The two-stage timer circuit 550 is well known in the art as a TTL 556 timer. The first section of the timer 550 is set so that it times for an interval sufficiently long enough to allow the obstructed closure to open before the second stage is engaged in to deactivate the circuit 22. When timer 550 is activated, timer 529 will have only begun to command the closure to reopen for the second time and thus the first stage of the timer 550 should match or exceed the timing interval of timer 529.

When the first stage of timer 550 is complete, the second stage is activated as is well known in the art. The timed output at 552 of the second stage is directed to amplification circuit 554 where it turns the same on. Amplification circuit 554 in turn generates a signal at 556.

The signal at 556 causes relay 558 to couple the five volt supply to its own coil so as to lock itself in the energized position and to couple the twelve volt power supply to the relay 504. The relay 504 reacts exactly the same way it would if the ignition switch had been turned to the "on" position decoupling the five volt power supply from the circuit to disable the circuit except for relay 558. A diode 559 prevents the twelve volts coupled to relay 504 from also being coupled to relay 560. Thus although relay 504 reacts as if the ignition switch had been turned "on", the same is not true for the entire circuit.

However, switching the ignition switch 36 to the "on" position couples relay 560 to the twelve volt power supply. Relay 560 then becomes energized and opens two normally closed contacts 562 and 564 to decouple the five volt power supply from the coil of relay 558 and the twelve volt supply from the coil of relay 504, respectively. By decoupling the five volt power supply, the system is again activated and ready to operate whenever the ignition switch is again turned off.

While a particular embodiment of the invention has been shown and described, modifications may be made, and it is intended in the appended claims to cover all such modifications as may fall within the true spirit and scope of the invention.

What is claimed is:

1. An improved electrical moisture sensing means for sensing moisture in excess of a predetermined level comprising:
   a pair of parallel electrically conductive plates subjected by a bottom insulating layer;
   an insulating layer separating said conductive plates, said separating insulating layer extending above said conductive plates and terminating in a bulbous portion with edges extending over said conductive plates to provide a groove for securing and aligning said conductive plates and to provide means for predetermining the level of moisture in excess of which said moisture sensing means senses moisture;
   whereby, said moisture sensing means senses moisture whenever moisture builds up on said conductive plates to a level sufficient to cover said bulbous portion and electrically bridge said conductive plates.

2. Moisture sensing means as defined in claim 1 wherein one of said conductive plates is coupled to ground and the other of said conductive plates is coupled to an input of a motor control circuit.

3. Moisture sensing means as defined in claim 1 wherein one of said conductive plates is coupled to an output and the other of said conductive plates is coupled to an input of a motor control circuit.

4. Moisture sensing means as defined in claim 1 wherein said bottom insulating layer and said separating insulating layer are of unitary construction.

* * * * *